United States Patent
Masuda et al.

(10) Patent No.: US 8,622,468 B2
(45) Date of Patent: Jan. 7, 2014

(54) SEAT BACK DEVICE

(75) Inventors: Ko Masuda, Yokohama (JP); Osamu Ooki, Yokohama (JP)

(73) Assignee: NHK Springs Co., Ltd., Yokohama-shi (JP)

( * ) Notice: Subject to any disclaimer, the term of this patent is extended or adjusted under 35 U.S.C. 154(b) by 60 days.

(21) Appl. No.: 13/190,331

(22) Filed: Jul. 25, 2011

(65) Prior Publication Data

US 2012/0025580 A1 Feb. 2, 2012

(30) Foreign Application Priority Data

Jul. 30, 2010 (JP) ................................. 2010-172872

(51) Int. Cl.
*A47C 17/04* (2006.01)

(52) U.S. Cl.
USPC .......................... 297/113; 297/238; 297/284.4

(58) Field of Classification Search
USPC ............... 297/113, 255, 411.32, 188.18, 238, 297/284.4; 296/37.15, 37.16
See application file for complete search history.

(56) References Cited

U.S. PATENT DOCUMENTS

| | | | | |
|---|---|---|---|---|
| 2,917,107 | A * | 12/1959 | Bloom et al. | 297/113 |
| 5,568,959 | A * | 10/1996 | Weber et al. | 297/238 |
| 5,603,550 | A * | 2/1997 | Holdampf et al. | 297/238 |
| 5,628,543 | A * | 5/1997 | Filipovich et al. | 297/113 |
| 5,662,377 | A * | 9/1997 | Holdampf et al. | 297/238 |
| 5,700,054 | A * | 12/1997 | Lang | 297/238 |
| 7,178,865 | B2 * | 2/2007 | Yetukuri et al. | 297/113 |
| 7,611,184 | B1 * | 11/2009 | Bisson et al. | 296/37.16 |
| 2002/0030376 | A1 * | 3/2002 | Butz et al. | 296/37.15 |
| 2004/0140697 | A1 * | 7/2004 | Yuhki et al. | 297/113 |
| 2005/0168016 | A1 * | 8/2005 | Svartvatn | 297/112 |
| 2006/0071529 | A1 * | 4/2006 | Yetukuri et al. | 297/411.32 |
| 2007/0108813 | A1 * | 5/2007 | Thomas | 297/255 |
| 2007/0296236 | A1 * | 12/2007 | Sitzler et al. | 296/37.8 |
| 2009/0309407 | A1 * | 12/2009 | Saito et al. | 297/411.32 |
| 2011/0316310 | A1 * | 12/2011 | Runde | 297/113 |

FOREIGN PATENT DOCUMENTS

JP    4-50846    12/1992

* cited by examiner

*Primary Examiner* — David Dunn
*Assistant Examiner* — Alexander Harrison
(74) *Attorney, Agent, or Firm* — Knobbe Martens Olson & Bear LLP

(57) ABSTRACT

There is provided a seat back device including: a seat back that is placed on a rear side of a vehicle cabin and has a movable portion that is movably disposed in correspondence to a lower back region of a seated passenger and a forwardly collapsible portion that is forwardly collapsibly disposed on a vehicle upper side of the movable portion; a frame member that is disposed inside the seat back and in which is formed an open portion that has a size including the movable portion and the forwardly collapsible portion and that makes the vehicle cabin and a luggage compartment communicate; an angle adjusting mechanism which adjusts the movable portion about an axis along a vehicle width direction to a predetermined angle; and a trunk-through mechanism which forwardly collapses the movable portion and the forwardly collapsible portion from the seat back and opens the open portion.

4 Claims, 7 Drawing Sheets

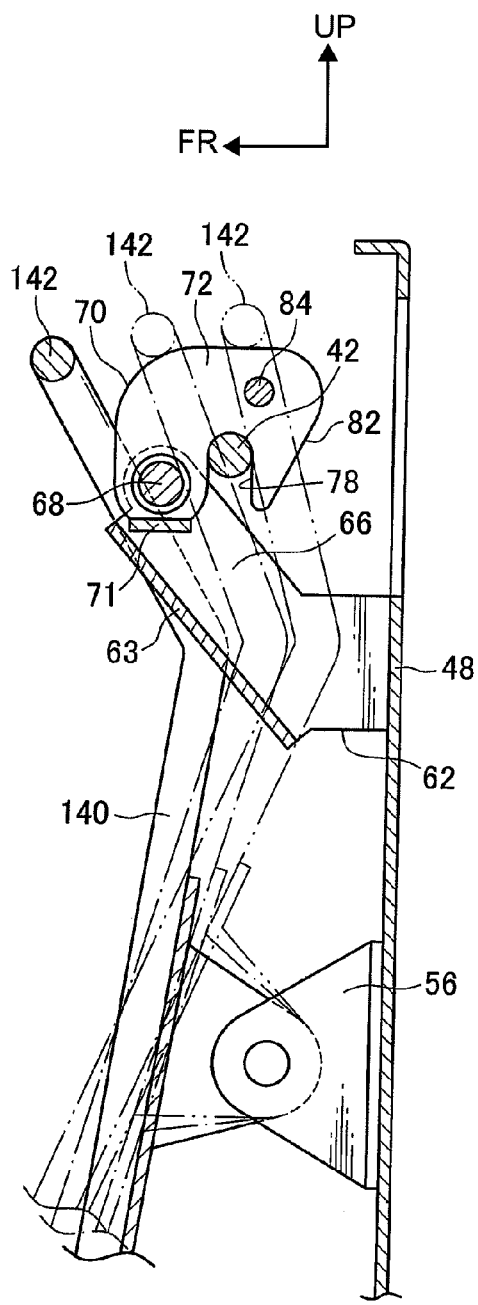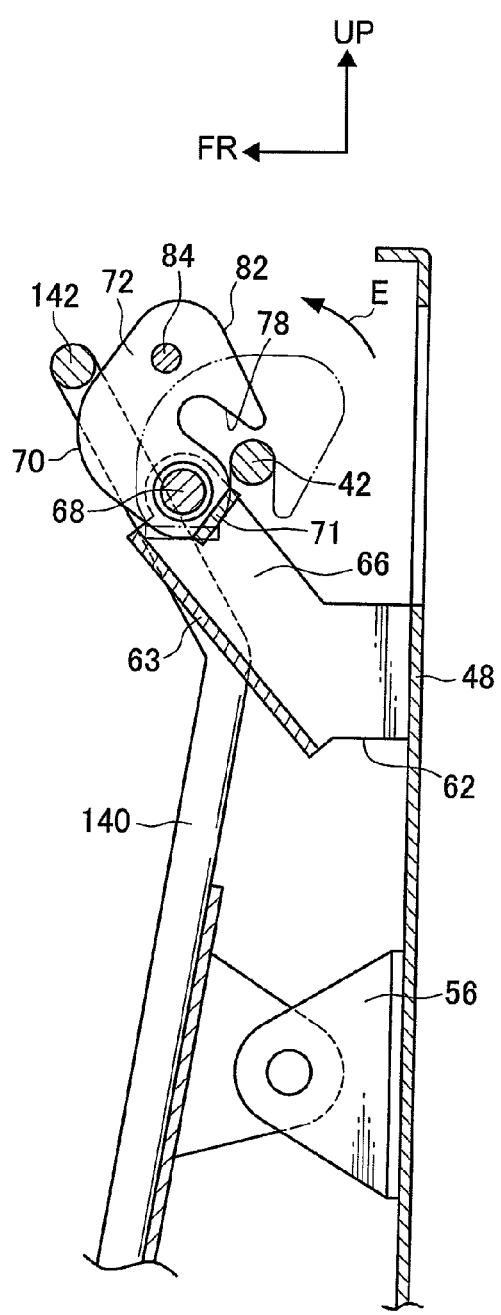

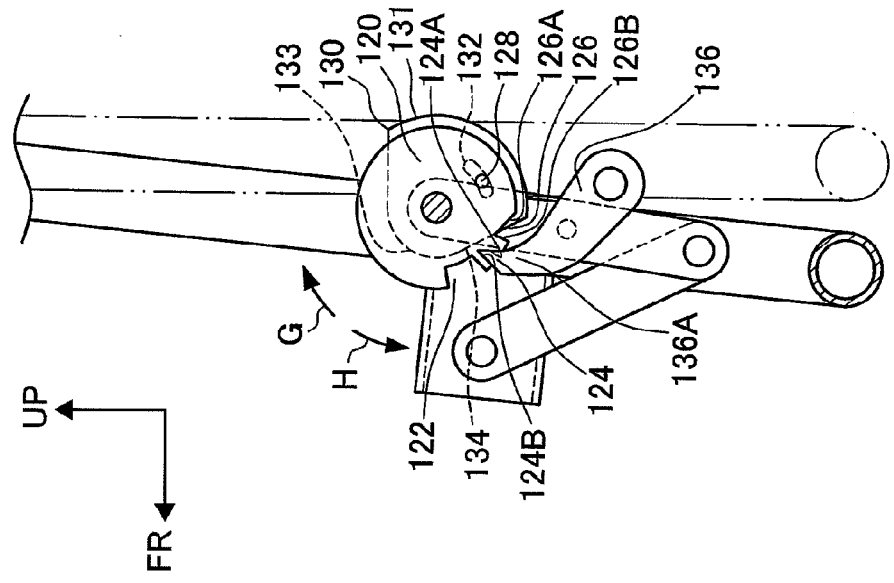
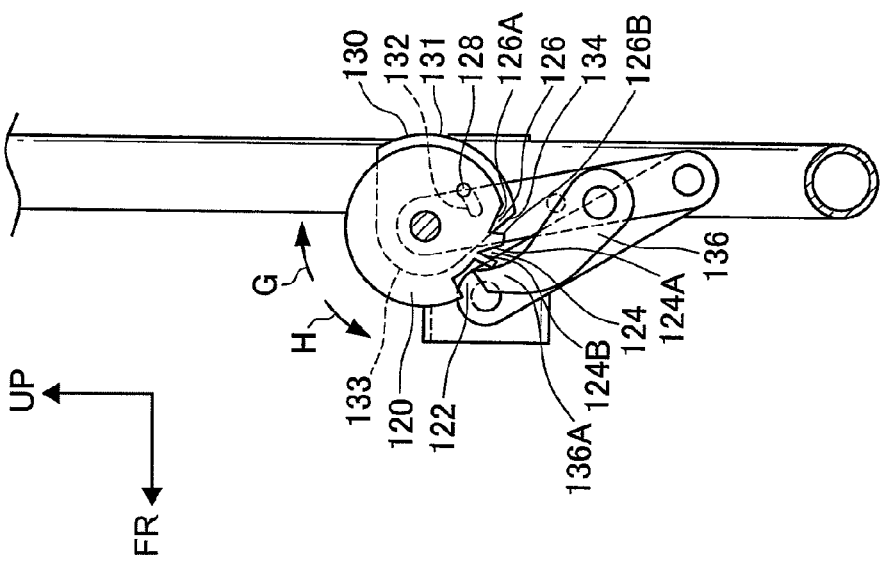

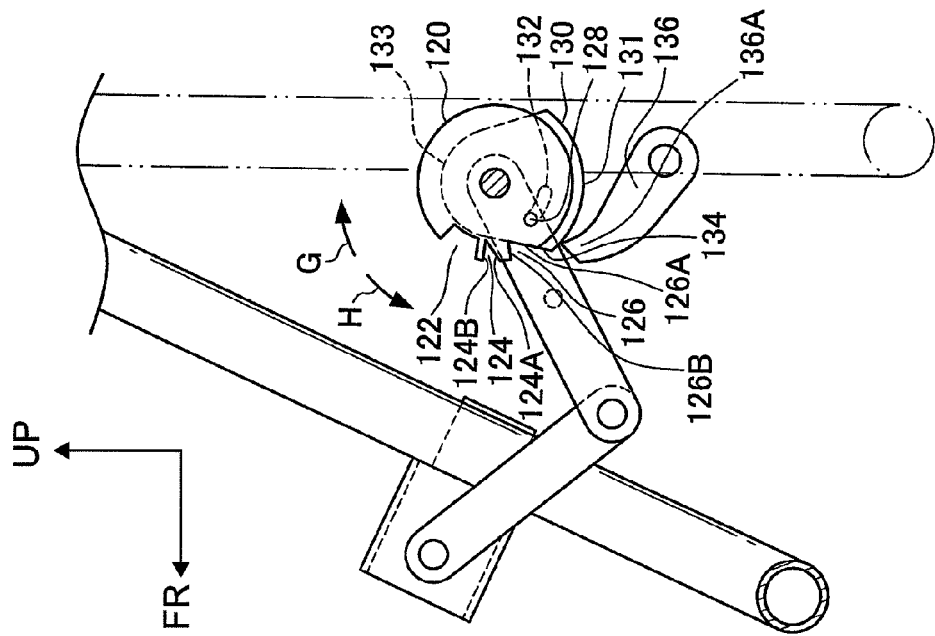
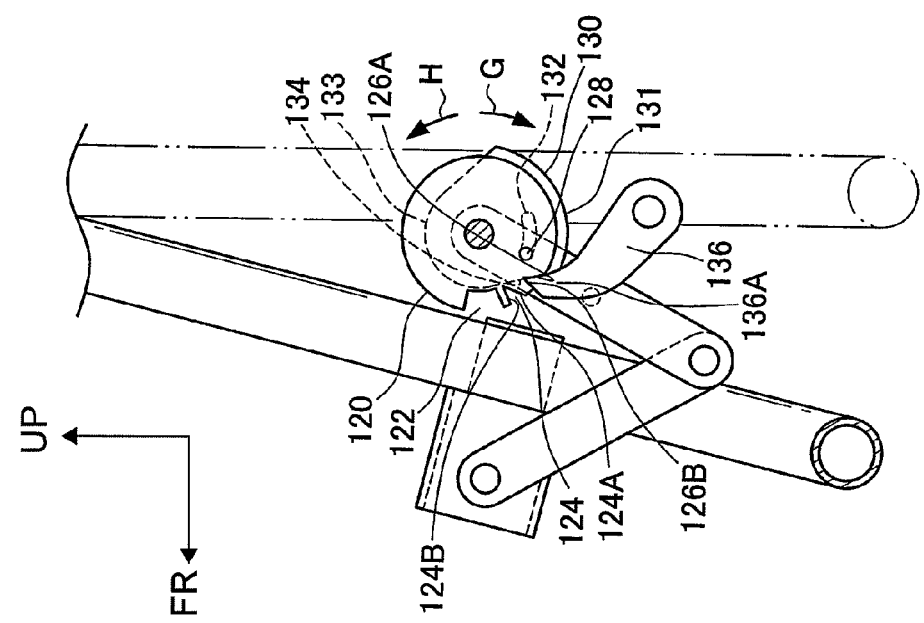

SEAT BACK DEVICE

CROSS-REFERENCE TO RELATED APPLICATION

This application is based on and claims priority under 35 USC 119 from Japanese Patent Application No. 2010-172872 filed on Jul. 30, 2010, the disclosure of which is incorporated by reference herein.

BACKGROUND

1. Technical Field

The present invention relates to a seat back device that is placed on a rear side of a vehicle cabin.

2. Related Art

Among seat back devices, there are seat back devices in which the angle of a cushion pad that supports the lumbar region of a passenger can be adjusted (e.g., see Japanese Examined Utility Model Application No. H4-50846). These seat back devices have the advantage that comfort is improved and passenger fatigue can be alleviated by adjusting the angle of the cushion pad.

Meanwhile, among seat back devices that are placed on a rear side of a vehicle cabin, there are seat back devices in which the vehicle cabin and a trunk room are made communicable by forwardly collapsing part of the seat back (a so-called trunk-through function). Seat back devices equipped with the trunk-through function have the advantage that luggage can be put into and taken out from between the vehicle cabin and the trunk room and long items of luggage can be accommodated in the vehicle.

Consequently, it is preferable for seat back devices that are placed on the rear side of the vehicle cabin to be equipped with both advantages.

SUMMARY

In consideration of the above facts, it is an object of the present invention to provide a seat back device in which the angle of part of the seat back can be adjusted and in which the vehicle cabin and the trunk room can be communicated.

A first aspect of the present invention provides a seat back device including:

a seat back that is placed on a rear side of a vehicle cabin and has a movable portion that is movably disposed in correspondence to a lower back region of a seated passenger and a forwardly collapsible portion that is forwardly collapsibly disposed on a vehicle upper side of the movable portion;

a frame member that is disposed inside the seat back and in which is formed an open portion that has a size including the movable portion and the forwardly collapsible portion and that makes the vehicle cabin and a luggage compartment communicate;

an angle adjusting mechanism which, as a result of being operated by the passenger, adjusts the movable portion about an axis along a vehicle width direction to a predetermined angle; and a trunk-through mechanism which, as a result of being operated by the passenger, forwardly collapses the movable portion and the forwardly collapsible portion from the seat back and opens the open portion.

A second aspect of the present invention provides the seat back device according to the first aspect, wherein when the movable portion is accommodated in the seat back, the movable portion and the forwardly collapsible portion are made forwardly collapsible from the seat back, and when the movable portion is adjusted to the predetermined angle, the movable portion and the forwardly collapsible portion are made forwardly non-collapsible from the seat back.

A third aspect of the present invention provides the seat back device according to the first aspect or second aspect, wherein the trunk-through mechanism is equipped with a base portion that is placed inside the open portion, is rotatably supported on the frame member, and to which the movable portion and the forwardly collapsible portion are directly or indirectly secured and a lock portion that is disposed on the base portion and which, by rotating, is made disengageable from a striker disposed on the seat back.

A fourth aspect of the present invention provides the seat back device according to the third aspect, wherein the angle adjusting mechanism is equipped with a movable frame that is rotatably supported on the base portion and to which the movable portion is secured, a rotating disc that is coupled to the movable frame, is rotated in conjunction with the rotation of the movable frame, and on whose outer peripheral portion is disposed a locking portion, a ratchet that is disposed on the base portion and regulates the rotation of the rotating disc by meshing with the locking portion, and a regulating portion that is coupled to the movable frame, makes the lock portion rotatable as a result of being placed outside a rotational trajectory of the lock portion when the movable frame is in an initial position, and makes the lock portion non-rotatable as a result of being placed on the rotational trajectory of the lock portion when the movable frame has been adjusted to a predetermined angle.

In the seat back device of the first aspect of the present invention, the seat back is placed on the rear side of the vehicle cabin, and the seat back has the movable portion that is movably disposed in correspondence to the lower back region of the seated passenger and the forwardly collapsible portion that is forwardly collapsibly disposed on the vehicle upper side of the movable portion. Further, the frame member is disposed inside the seat back, and the open portion that makes the vehicle cabin and the luggage compartment communicable is formed in the frame member. Further, the open portion has a size including the movable portion and the forwardly collapsible portion of the seat back.

Here, as a result of being operated by the passenger, the angle adjusting mechanism adjusts the movable portion of the seat back to a predetermined angle. Moreover, as a result of being operated by the passenger, the trunk-through mechanism forwardly collapses the movable portion and the forwardly collapsible portion of the seat back from the seat back, and the open portion in the frame member is opened.

For this reason, in this seat back device, the angle of the movable portion of the seat back can be adjusted, and the vehicle cabin and the luggage compartment can be communicated. Because of this, passenger comfort can be ensured and long items of luggage can be accommodated.

In the seat back device of the second aspect of the present invention, when the movable portion is accommodated in the seat back, the movable portion and the forwardly collapsible portion are made forwardly collapsible from the seat back, and when the movable portion has been adjusted to a predetermined angle, the movable portion and the forwardly collapsible portion are made forwardly non-collapsible from the seat back.

For this reason, when the movable portion is accommodated in the seat back, the movable portion and the forwardly collapsible portion can be forwardly collapsed from the seta back. Because of this, when forwardly collapsing the movable portion and the forwardly collapsible portion, a situation where the movable portion and the forwardly collapsible portion are not forwardly collapsed all the way as a result of the movable portion which has been adjusted to a predetermined angle becoming an obstacle can be prevented. Moreover, damage to the angle adjusting mechanism, when the seat back has been further forwardly collapsed in a state where the movable portion and the forwardly collapsible portion are not forwardly collapsed all the way, can be prevented.

In the seat back device of the third aspect of the present invention, the base portion is placed in the open portion in the frame member and is rotatably supported on the frame member. Further, the movable portion and the forwardly collapsible portion are directly or indirectly secured to the base portion. Moreover, the lock portion is disposed on the base portion, and the lock portion, by rotating, is made disengageable from the striker disposed on the seat back.

For this reason, the movable portion and the forwardly collapsible portion of the seat back can be forwardly collapsed as a result of the lock portion rotating, the lock portion being disengaged from the striker, and the base portion being rotated. Because of this, parts that forwardly collapse the movable portion and the forwardly collapsible portion can be shared.

In the seat back device of the fourth aspect of the present invention, the movable frame is rotatably supported on the base portion, and the movable portion is secured to the movable frame. Further, the rotating disc is coupled to the movable frame, and the rotating disc is rotated in conjunction with the rotation of the movable frame. Further, the locking portion is disposed on the outer peripheral portion of the rotating disc, and the ratchet engages with the locking portion, whereby the rotation of the rotating disc is regulated. Because of this, the rotation of the movable frame is regulated, and the angle of the movable portion of the seat back is adjusted.

Here, the regulating portion is coupled to the movable frame, and the lock portion is made rotatable as a result of the regulating portion being placed outside the rotational trajectory of the lock portion when the movable frame is in the initial state. Further, the lock portion is made non-rotatable as a result of the regulating portion being placed on the rotational trajectory of the lock portion when the movable frame has been adjusted to a predetermined angle.

For this reason, with a simple configuration that couples the regulating portion to the movable frame, when the movable portion is accommodated in the seat back, the movable portion and the forwardly collapsible portion can be made forwardly collapsible from the seat back, and when the movable portion has been adjusted to a predetermined angle, the movable portion and the forwardly collapsible portion can be made forwardly non-collapsible from the seat back.

BRIEF DESCRIPTION OF THE DRAWINGS

An exemplary embodiment of the present invention will be described in detail based on the following figures, wherein:

FIG. 4A is a cross-sectional view showing a state of disengagement between a hook bracket and a wire of the seat back device pertaining to the embodiment of the present invention and is particularly a cross-sectional view showing a state where the hook bracket is engaged with the wire;

FIG. 4B is a cross-sectional view showing a state of disengagement between the hook bracket and the wire of the seat back device pertaining to the embodiment of the present invention and is particularly a cross-sectional view showing a state where the hook bracket has been disengaged from the wire;

FIG. 5A is a side view of main portions of an angle adjusting mechanism of the seat back device pertaining to the embodiment of the present invention and is particularly a side view showing when the angle adjusting mechanism is positioned in an initial state;

FIG. 5B is a side view of main portions of the angle adjusting mechanism of the seat back device pertaining to the embodiment of the present invention and is particularly a side view showing when the angle adjusting mechanism is positioned in a first adjustment position;

FIG. 6A is a side view of main portions of the angle adjusting mechanism of the seat back device pertaining to the embodiment of the present invention and is particularly a side view showing when the angle adjusting mechanism is positioned in a second adjustment position;

FIG. 6B is a side view of main portions of the angle adjusting mechanism of the seat back device pertaining to the embodiment of the present invention and is particularly a side view showing when the angle adjusting mechanism is positioned in a release position;

DETAILED DESCRIPTION

Figure 1:
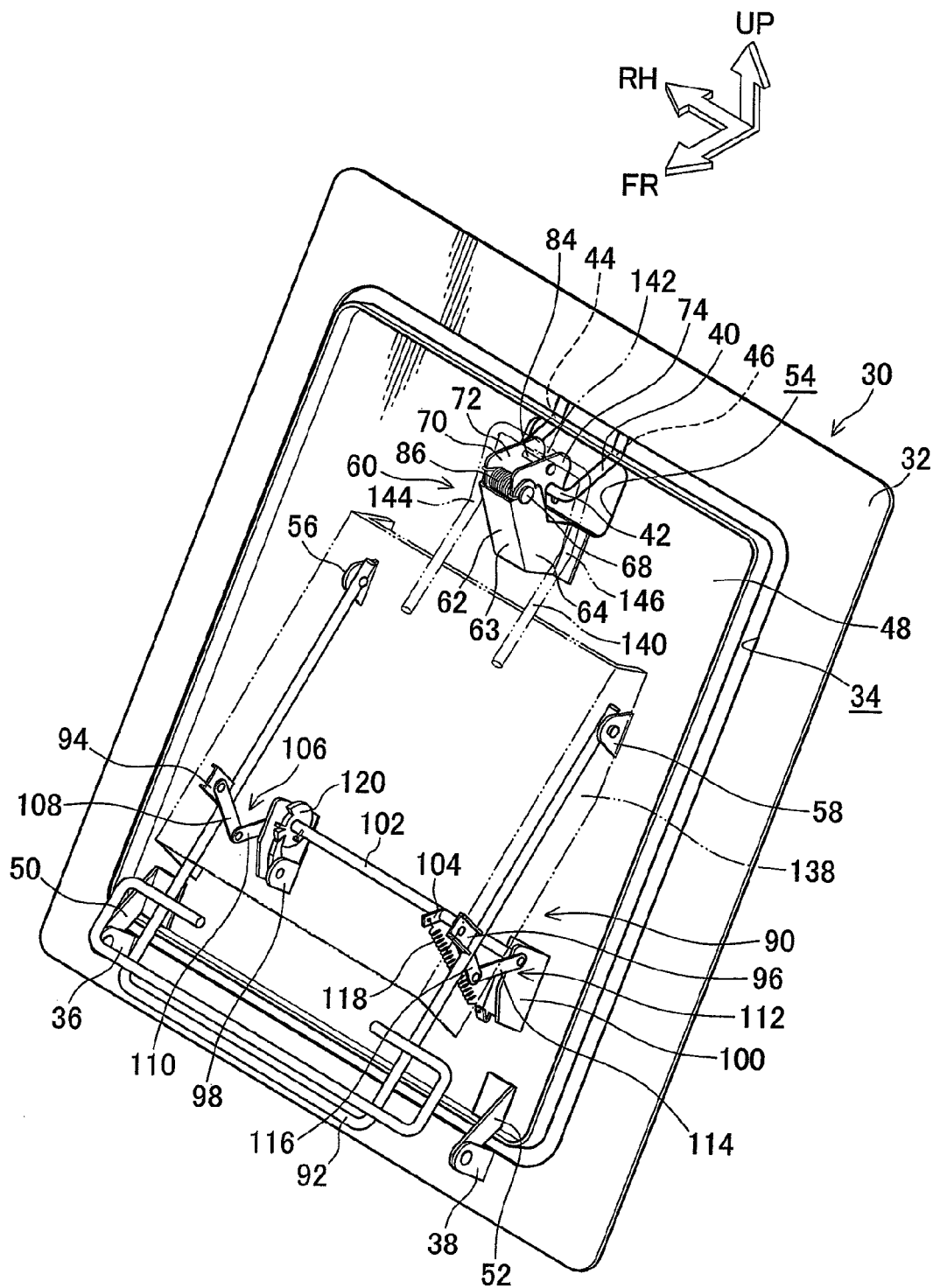
FIG. 1 is a perspective view showing main portions of a seat back device pertaining to the embodiment of the present invention.
Figure 3:
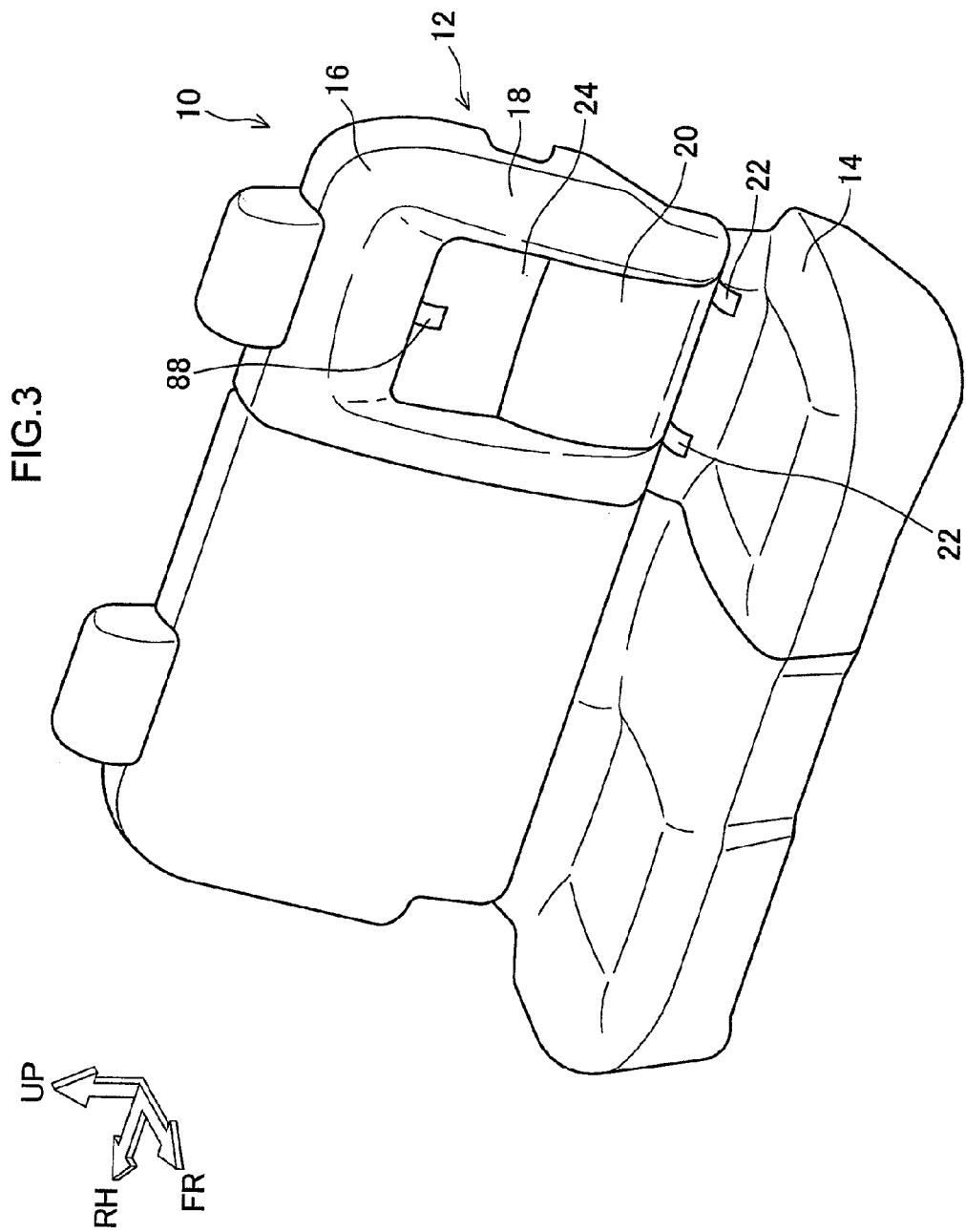
FIG. 3 is a perspective view showing a rear seat to which the seat back device pertaining to the embodiment of the present invention is applied.

In FIG. 3, a rear seat 12 to which a seat back device 10 pertaining to an embodiment of the present invention is applied is shown in a perspective view, and in FIG. 1, main portions of the seat back device 10 pertaining to the embodiment of the present invention are shown in a perspective view. In the drawings, arrow FR represents a vehicle front direction, arrow RH represents a vehicle right direction, and arrow UP represents a vehicle up direction.

The seat back device 10 pertaining to the present embodiment is disposed in a vehicle left-side portion and a vehicle right-side portion of the rear seat 12. For this reason, the seat back device 10 in the vehicle left-side portion of the rear seat 12 will be described, and description of the seat back device 10 in the vehicle right-side portion of the rear seat 12 will be omitted.

As shown in FIG. 3, the rear seat 12 is placed on a vehicle rear side of a vehicle cabin. The rear seat 12 is equipped with a rear seat cushion 14 serving as a seat cushion on which a passenger sits and a rear seat back 16 serving as a seat back. The rear seat back 16 is placed in an erect state on the rear side end portion of the rear seat cushion 14.

The rear seat back 16 is equipped with a back pad 18 serving as a body portion, and the back pad 18 is secured to the vehicle. The rear seat back 16 is also equipped with a movable pad 20 serving as a movable portion, and the movable pad 20 is placed in the lower central portion of the rear seat back 16 in correspondence to the lower back region of a seated passenger and is secured to a later-described upper bracket 138. Multiple (in the present embodiment, two) band-like straps 22 are placed on the lower side of the movable pad 20, with one end of one of the straps 22 being secured to the lower right portion of the movable pad 20 and one end of the other of the straps 22 being secured to the lower left portion of the movable pad 20. Further, the rear seat back 16 is also equipped a forwardly collapsible pad 24 serving as a forwardly collapsible portion, and the forwardly collapsible pad 24 is placed on the upper side of the movable pad 20 and is secured to a later-described base portion 48.

(Trunk-Through Mechanism)

Figure 2:
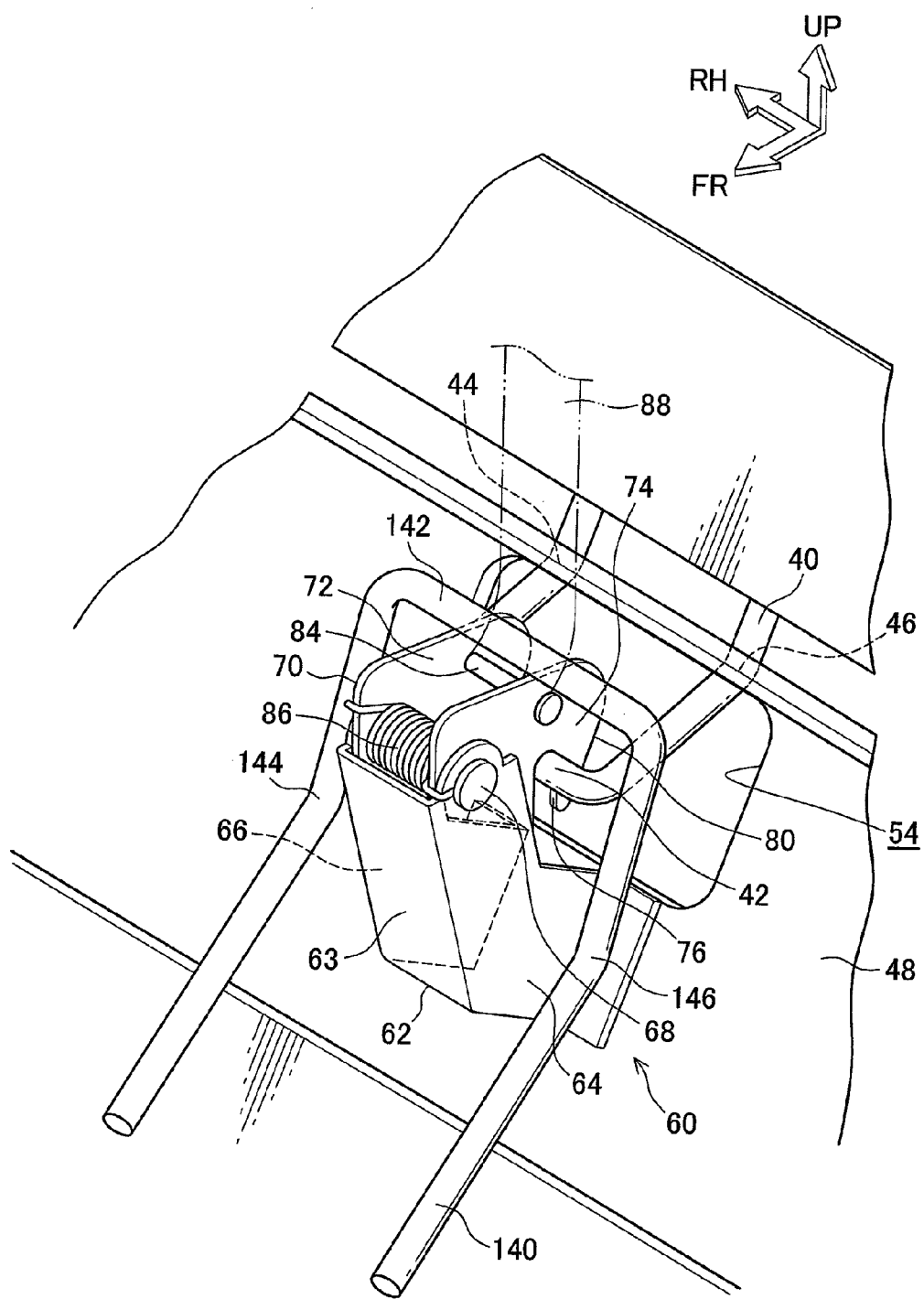
FIG. 2 is a perspective view showing a lock mechanism of the seat back device pertaining to the embodiment of the present invention.

As shown in FIG. 1 and FIG. 2, the rear seat back 16 is equipped with a rectangular frame-like frame 32 serving as a frame member that configures a trunk-through mechanism 30. The frame 32 is placed on the rear side of the movable pad 20 and the forwardly collapsible pad 24 and is secured to the rear seat back 16. A rectangular communicating hole 34 serving as an open portion is penetratingly disposed in the central portion of the frame 32, and the vehicle cabin and a trunk room serving as a luggage compartment are made communicable via the communicating hole 34. Further, the communicating hole 34 is made into a size including the movable pad 20 and the forwardly collapsible pad 24. A support portion 36 and a support portion 38 that make a pair are integrally uprightly disposed frontward on the lower portion of the frame 32, and the support portion 36 and the support portion 38 are placed parallel to each other.

A long rod-like striker 40 is disposed on the upper side of the frame 32, and the striker 40 is bent in a substantial U shape. Both lengthwise direction ends of the striker 40 are secured to the upper portion of the rear seat back 16, and the striker 40 extends downward to a middle portion 42 from both lengthwise direction ends. A bent portion 44 is disposed between one lengthwise direction end of the striker 40 and the middle portion 42, and a bent portion 46 is disposed between the other lengthwise direction end of the striker 40 and the middle portion 42. Moreover, the bent portion 44 and the bent portion 46 are bent such that the middle portion 42 of the striker 40 projects toward the communicating hole 34.

A rectangular plate-like base portion 48 that configures the trunk-through mechanism 30 is placed inside the communicating hole 34 in the frame 32, and a cross-sectionally L-shaped mounting bracket 50 is placed on the lower right portion of the base portion 48 on the front side of the base portion 48. One end portion of the mounting bracket 50 is secured to the base portion 48, and the other end portion of the mounting bracket 50 is supported so as to be rotatable in the vehicle front-rear direction on the support portion 36 of the frame 32. Further, a cross-sectionally L-shaped mounting bracket 52 is placed on the lower left portion of the base portion 48 on the front side of the base portion 48. One end portion of the mounting bracket 52 is secured to the base portion 48, and the other end portion of the mounting bracket 52 is supported so as to be rotatable in the vehicle front-rear direction on the support portion 38 of the frame 32. Because of this, the base portion 48 is made rotatable in the vehicle front-rear direction with respect to the frame 32.

A rectangular hole portion 54 is disposed in the upper portion of the base portion 48, and the striker 40 is inserted through the hole portion 54. A support portion 56 and a support portion 58 that make a pair are integrally uprightly disposed frontward on the central portion of the base portion 48, and the support portion 56 and the support portion 58 are placed parallel to each other.

As shown in FIG. 2, FIG. 4A, and FIG. 4B, a lock mechanism 60 that configures the trunk-through mechanism 30 is disposed on the upper portion of the base portion 48 on the front side of the base portion 48. The lock mechanism 60 is equipped with a holder 62, and the holder 62 has a plate-like basal portion 63. The basal portion 63 is placed slanting in a direction heading frontward closer toward to its upper side, and a side wall 64 and a side wall 66 integrally extend rearward from both width direction (vehicle left-right direction) ends of the basal portion 63. The rear portions of the side wall 64 and the side wall 66 are bent perpendicularly to the side wall 64 and the side wall 66 and are secured to the base portion 48. Further, a shaft 68 is disposed along the vehicle left-right direction on the front portion of the holder 62 so as to bridge the side wall 64 and the side wall 66.

A hook bracket 70 serving as a lock portion that configures the lock mechanism 60 is placed between the side wall 64 and the side wall 66. The hook bracket 70 has a basal portion 71, and a side plate 72 and a side plate 74 integrally extend upward from both width direction (vehicle left-right direction) ends of the basal portion 71. The shaft 68 penetrates the side plate 72 and the side plate 74, and the hook bracket 70 is supported so as to be rotatable in the vehicle front-rear direction with respect to the holder 62.

A recessed portion 76 and a recessed portion 78 that open downward are penetratingly formed in the central portions of the side plate 72 and the side plate 74, and the recessed portion 76 and the recessed portion 78 engage with the middle portion 42 of the striker 40 (the state shown in FIG. 4A; this position will be called an "engaged position" below). Further, when the hook bracket 70 is rotated in one direction about the axial direction of the shaft 68 (the direction of arrow E in FIG. 4B), the recessed portion 76 and the recessed portion 78 become separated from the middle portion 42 of the striker 40, and the recessed portion 76 and the recessed portion 78 become disengaged from the middle portion 42 of the striker 40 (the state shown in FIG. 4B; this position will be called a "disengaged position" below).

A slanted portion 80 and a slanted portion 82 are disposed on the rear portions of the side plate 72 and the side plate 74, and the slanted portion 80 and the slanted portion 82 are slanted in a direction heading frontward closer toward their lower sides. Further, a shaft 84 is disposed along the vehicle left-right direction so as to bridge the side plate 72 and the side plate 74.

The lock mechanism 60 is equipped with a torsion spring 86 serving as biasing means, and the shaft 68 is inserted through the torsion spring 86. One end portion of the torsion spring 86 is engaged with the side wall 64 of the holder 62, the other end portion of the torsion spring 86 is engaged with the side plate 72 of the hook bracket 70, and the torsion spring 86 biases the hook bracket 70 toward the engaged position.

A long band-like strap 88 is placed on the upper side of the hook bracket 70. One lengthwise direction end of the strap 88 is coupled to the shaft 84, and the other lengthwise direction end of the strap 88 is placed on the upper side of the forwardly collapsible pad 24. For this reason, when the strap 88 is pulled toward the vehicle front side, the hook bracket 70 is rotated toward the disengaged position counter to the biasing force of the torsion spring 86 via the shaft 84, and the hook bracket 70 becomes disengaged from the striker 40. Because of this, the base portion 48 is made rotatable in the vehicle front direction.

(Angle Adjusting Mechanism)

As shown in FIG. 1, a long rod-like movable frame 92 that configures an angle adjusting mechanism 90 is placed on the front side of the base portion 48. The movable frame 92 is bent in a substantial U shape, both lengthwise direction end portions of the movable frame 92 are coaxially supported along the vehicle width direction (vehicle left-right direction) on the support portion 56 and the support portion 58, and the movable frame 92 is made rotatable in the vehicle front-rear direction.

A cross-sectionally U-shaped bearing bracket 94 is placed on the front portion of the movable frame 92 on the right side portion of the movable frame 92. The bearing bracket 94 opens rightward and is joined to the movable frame 92. Further, a cross-sectionally U-shaped bearing bracket 96 is placed on the front portion of the movable frame 92 on the left side portion of the movable frame 92. The bearing bracket 96 opens leftward and is joined to the movable frame 92.

A cross-sectionally substantially U-shaped lower bracket 98 is placed on the left side of the bearing bracket 94, and the lower bracket 98 opens frontward and is secured to the base portion 48. Further, a cross-sectionally substantially L-shaped lower bracket 100 is placed on the right side of the bearing bracket 96, and one end portion of the lower bracket 100 is secured to the base portion 48.

A cylindrical support shaft 102 penetrates the lower bracket 98 and the lower bracket 100 along the vehicle width direction (vehicle left-right direction), and the support shaft 102 is rotatably supported on the lower bracket 98 and the lower bracket 100. An arm 104 is integrally disposed on the portion of the support shaft 102 on the lower bracket 100 side, and the arm 104 corresponds to a later-described coil spring 118.

A link mechanism 106 that configures the angle adjusting mechanism 90 is placed between the lower bracket 98 and the bearing bracket 94, and the link mechanism 106 is equipped with a plate-like link 108 and a plate-like link 110. One end portion of the link 108 and one end portion of the link 110 are rotatably coupled together, and the other end portion of the link 108 is rotatably coupled to the bearing bracket 94. The other end portion of the link 110 is secured to one lengthwise direction end of the support shaft 102, and the link 110 is made integrally rotatable with the support shaft 102.

A link mechanism 112 that configures the angle adjusting mechanism 90 is placed between the lower bracket 100 and the bearing bracket 96, and the link mechanism 112 is equipped with a plate-like link 114 and a plate-like link 116. One end portion of the link 114 and one end portion of the link 116 are rotatably coupled together, and the other end portion of the link 116 is rotatably coupled to the bearing bracket 96. The other end portion of the link 114 is secured to the other lengthwise direction end of the support shaft 102, and the link 114 is made integrally rotatable with the support shaft 102. Because of this, when the movable frame 92 in the vehicle front direction, the support shaft 102 is rotated in one direction about its axis (the direction of arrow G in FIG. 5A and FIG. 5B) via the link mechanism 106 and the link mechanism 112, and when the movable frame 92 is rotated in the vehicle rear direction, the support shaft 102 is rotated in the other direction about its axis (the direction of arrow H in FIG. 5A and FIG. 5B) via the link mechanism 106 and the link mechanism 112.

A coil spring 118 is disposed so as to bridge the lower bracket 100 and the arm 104, and the coil spring 118 biases the support shaft 102 in the other direction about its axis (the direction of arrow H in FIG. 5A and FIG. 5B).

A disc-shaped lock gear 120 serving as a rotating disc that configures the angle adjusting mechanism 90 is placed coaxially on the portion of the support shaft 102 on the lower bracket 98 side, and the lock gear 120 is secured to the support shaft 102 and is made integrally rotatable with the support shaft 102.

As shown in FIG. 5A, FIG. 5B, FIG. 6A, and FIG. 6B, a substantially trapezoidal recessed portion 122 is disposed in the outer peripheral portion of the lock gear 120, and a first locking portion 124 serving as a locking portion is disposed on one side of the recessed portion 122 in the circumferential direction of the lock gear 120 (the arrow H direction side in FIG. 5A, FIG. 5B, FIG. 6A, and FIG. 6B). A first slanted surface 124A is disposed on the one side portion of the first locking portion 124 in the circumferential direction of the lock gear 120, and the first slanted surface 124A is slanted in a direction heading outward in the radial direction of the lock gear 120 toward the one side in the circumferential direction of the lock gear 120. A first locking surface 124B is disposed on the other side portion of the first locking portion 124 in the circumferential direction of the lock gear 120, and the first locking surface 124B is formed outward in the radial direction of the lock gear 120 from the other side portion of the first slanted surface 124A in the circumferential direction of the lock gear 120.

A second locking portion 126 serving as a locking portion is disposed on one side of the first locking portion 124 in the circumferential direction of the lock gear 120 (the arrow H direction side in FIG. 5A, FIG. 5B, FIG. 6A, and FIG. 6B). A second slanted surface 126A is disposed on the one side portion of the second locking portion 126 in the circumferential direction of the lock gear 120, and the second slanted surface 126A is slanted in a direction heading outward in the radial direction of the lock gear 120 toward the one side in the circumferential direction of the lock gear 120. A second locking surface 126B is disposed on the other side portion of the second locking portion 126 in the circumferential direction of the lock gear 120, and the second locking surface 126B is formed outward in the radial direction of the lock gear 120 from the other side portion of the second slanted surface 126A in the circumferential direction of the lock gear 120.

A cylindrical stopper pin 128 is projectingly disposed on the right side surface of the lock gear 120, and the stopper pin 128 corresponds to a long hole 132 in a later-described cam 130.

A substantially fan-shaped cam 130 that configures the angle adjusting mechanism 90 is placed on the right side of the lock gear 120, and the cam 130 is rotatably supported on the support shaft 102. A long hole 132 is penetratingly disposed in the side surface of the cam 130, and the long hole 132 is formed curving along the circumferential direction of the cam 130. The aforementioned stopper pin 128 is movably inserted into the long hole 132, and the cam 130 is made relatively rotatable with respect to the lock gear 120 in the range in which the stopper pin 128 moves from one end to the other end of the long hole 132.

A sliding surface 131 is disposed on the outer peripheral portion of the cam 130, and the sliding surface 131 is formed concentrically with the outer peripheral surface of the lock gear 120 and is placed on the outer side of the outer peripheral surface of the lock gear 120 in the radiation direction of the lock gear 120. A non-contact surface 133 is disposed on the opposite side of the sliding surface 131 of the cam 130, and the non-contact surface 133 is formed concentrically with the outer peripheral surface of the lock gear 120 and is placed on the inner side of the recessed portion 122 of the lock gear 120 in the radial direction of the lock gear 120. A cam-side slanted surface 134 is disposed on the outer peripheral portion of the cam 130 on the first locking portion 124 side of the lock gear 120.

When the lock gear 120 has been relatively rotated with respect to the cam 130 and the stopper pin 128 has been moved to the other end of the long hole 32, the cam-side slanted surface 134 and the second slanted surface 126A are configured to become even.

A plate-shape ratchet 136 that configures the angle adjusting mechanism 90 is placed on the lower side of the lock gear 120. One end portion of the ratchet 136 is supported so as to be rotatable in the vehicle front-rear direction on the lower bracket 98. A ratchet tooth 136A is disposed on the other end portion of the ratchet 136, and the ratchet tooth 136A is formed so as to be meshable with the first locking portion 124 and the second locking portion 126 of the lock gear 120. Moreover, the ratchet 136 is biased by an unillustrated torsion spring in the direction in which the ratchet tooth 136A meshes with the first locking portion 124 and the second locking portion 126 of the lock gear 120.

As shown in FIG. 1, a substantially cross-sectionally U-shaped upper bracket 138 that configures the angle adjusting mechanism 90 is placed on the front side of the movable frame 92, and the upper bracket 138 opens toward the movable frame 92 and covers the movable frame 92. The upper bracket 138 is coaxially supported along the vehicle width direction (vehicle left-right direction) on the support portion 56 and the support portion 58 and is made integrally rotatable with the movable frame 92 in the vehicle front-rear direction. For this reason, the movable pad 20 is secured to the movable frame 92 via the upper bracket 138 and is secured to the base portion 48 via the upper bracket 138 and the movable frame 92.

A long rod-like wire 140 serving as a regulating portion that configures the angle adjusting mechanism 90 is disposed on the upper portion of the upper bracket 138 on the front side of the upper bracket 138, and the wire 140 is bent in a substantial U shape. Both lengthwise direction ends of the wire 140 are secured to the upper portion of the upper bracket 138, and the wire 140 extends upward toward a middle portion 142 from both lengthwise direction ends of the wire 140. Because of this, the wire 140 is coupled to the movable frame 92 via the upper bracket 138. A bent portion 144 is disposed between one lengthwise direction end of the wire 140 and the middle portion 142, and a bent portion 146 is disposed between the other lengthwise direction end of the wire 140 and the middle portion 142. The bent portion 144 and the bent portion 146 are bent such that the middle portion 142 of the wire 140 is placed on the front side of the hook bracket 70.

Here, before the movable frame 92 is rotated, the ratchet tooth 136A is accommodated in the recessed portion 122 of the lock gear 120. Further, the stopper pin 128 of the lock gear 120 is positioned in the one end of the long hole 132 in the cam 130 (the state shown in FIG. 5A; this state will be called an "initial state" below). Moreover, in this state, the middle portion 142 of the wire 140 is positioned on the upper side and the front side of the hook bracket 70 and is placed outside the rotational trajectory of the hook bracket 70 (the state indicated by the solid lines in FIG. 4A).

Further, when the movable frame 92 has been rotated toward the vehicle front side, the lock gear 120 is relatively rotated with respect to the cam 130 in the one direction about its axis (the direction of arrow G in FIG. 5A and FIG. 5B) via the link mechanism 106, the link mechanism 112, and the support shaft 102. At this time, the ratchet tooth 136A meshes with the first locking portion 124, and the rotation of the lock gear 120 is regulated. Moreover, the stopper pin 128 of the lock gear 120 moves between the one end and the other end of the long hole 132 in the cam 130 (the state shown in FIG. 5B; this state will be called a "first adjustment position" below).

When the movable frame 92 has been further rotated toward the vehicle front side, the lock gear 120 is relatively rotated with respect to the cam 130 in the one direction about its axis via the link mechanism 106, the link mechanism 112, and the support shaft 102. At this time, the ratchet tooth 136A meshes with the second locking portion 126, and the rotation of the lock gear 120 is regulated. Moreover, the stopper pin 128 of the lock gear 120 moves to the other end of the long hole 132 in the cam 130 (the state shown in FIG. 6A; this state will be called a "second adjustment position" below).

As shown in FIG. 4A, when the movable frame 92 has been rotated to the first adjustment position and the second adjustment position, the upper bracket 138 is rotated in the vehicle front direction, whereby the middle portion 142 of the wire 140 secured to the upper bracket 138 is configured to be moved to the vehicle upper side of the hook bracket 70 and placed on the rotational trajectory of the upper bracket 70 (the state indicated by the double-dashed chain lines in FIG. 4A).

Next, the action of the present invention will be described.

When the movable pad 20 and the forwardly collapsible pad 24 of the rear seat back 16 are accommodated in the back pad 18, the movable frame 92 is placed in the initial state. In this state, the middle portion 142 of the wire 140 is positioned on the upper side and the front side of the hook bracket 70 and is placed outside the rotational trajectory of the hook bracket 70. For this reason, the hook bracket 70 is made rotatable.

In the case of using the trunk-through function, when the passenger pulls the strap 88 toward the vehicle upper side, the hook bracket 70 is rotated toward the disengaged position counter to the biasing force of the torsion spring 86 via the shaft 84. When the hook bracket 70 is rotated toward the disengaged position, the recessed portion 76 and the recessed portion 78 of the hook bracket 70 become separated from the middle portion 42 of the striker 40, and the hook bracket 70 becomes disengaged from the striker 40. Because of this, the base portion 48 is made rotatable toward the vehicle front side.

Figure 7A:
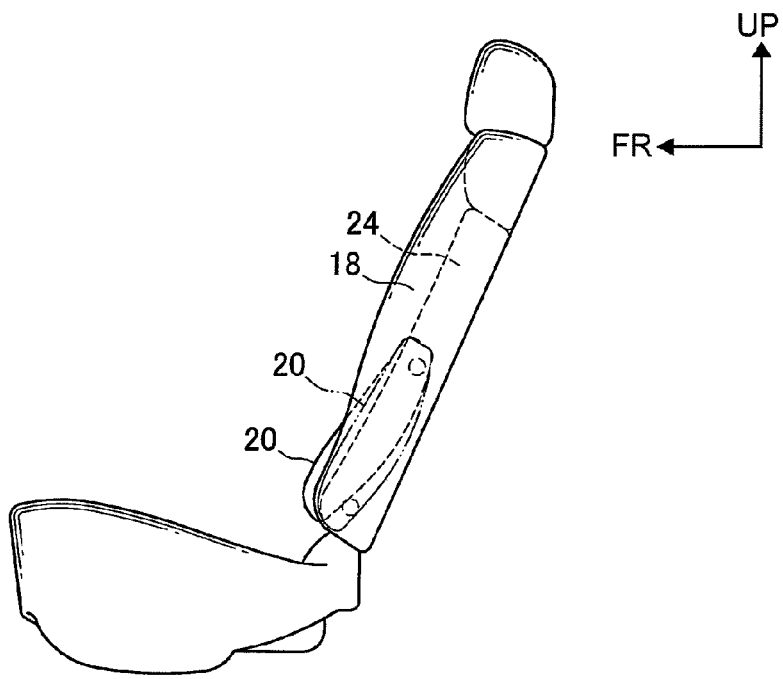
FIG. 7A is a side view of the rear seat to which the seat back device pertaining to the embodiment of the present invention is applied and is particularly a side view showing when a movable pad has been adjusted to a predetermined position.
Figure 7B:
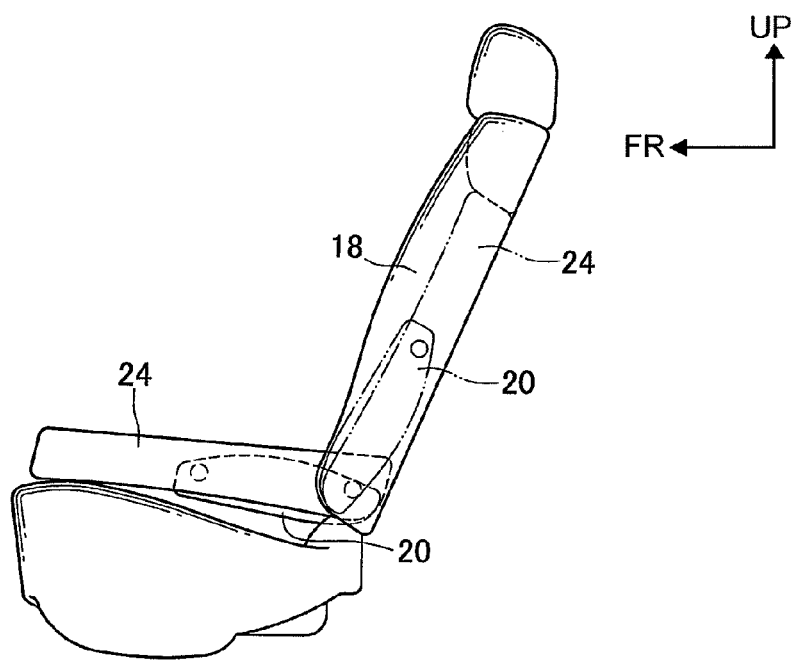
FIG. 7B is a side view of the rear seat to which the seat back device pertaining to the embodiment of the present invention is applied and is particularly a side view showing when a movable pad and a forwardly collapsible pad have been forwardly collapsed from a seat back.

In this state, when the strap 88 is pulled frontward, the forwardly collapsible pad 24 is forwardly collapsed from the back pad 18 via the base portion 48, and the movable pad 20 is forwardly collapsed from the back pad 18 via the base portion 48, the movable frame 92, and the upper bracket 138. At this time, the movable pad 20 is in the initial state, so the front side surface of the forwardly collapsible pad 24 becomes forwardly collapsible until it contacts the seat cushion 14 (the state shown in FIG. 7B). Because of this, the communicating hole 34 in the frame 32 is opened, and the vehicle cabin and the trunk room are made communicable via the communicating hole 34.

On the other hand, when the movable pad 20 and the forwardly collapsible pad 24 are to be accommodated in the back pad 18 of the rear seat back 16, the movable pad 20 and the forwardly collapsible pad 24 are stood up from their forwardly collapsed state. At this time, the base portion 48 is rotated toward the vehicle rear side, and the slanted portion 80 and the slanted portion 82 of the hook bracket 70 are brought into contact with the striker 40. At this time, a rotational force in the direction counter to the biasing force of the torsion spring 86 acts on the slanted portion 80 and the slanted portion 82 from the striker 40, and the hook bracket 70 is rotated toward the disengaged position. Moreover, the striker 40 slides on the slanted portion 80 and the slanted portion 82, and when the striker 40 has reached the boundary portion between the slanted portion 80 and the recessed portion 76 and the boundary portion between the slanted portion 82 and the recessed portion 78, the hook bracket 70 is rotated toward the engaged position by the biasing force of the torsion spring 86, and the recessed portion 76 and the recessed portion 78 engage with the striker 40. Because of this, the base portion 48 is secured to the frame 32 by the lock mechanism 60, and the movable pad 20 and the forwardly collapsible pad 24 are accommodated in the back pad 18.

Next, in the case of adjusting the angle of the movable pad 20 when the movable pad 20 and the forwardly collapsible pad 24 are accommodated in the back pad 18, the passenger pulls the straps 22 toward the vehicle front side. When the straps 22 are pulled toward the vehicle front side, the movable frame 92 is rotated toward the vehicle front side from the initial state via the movable pad 20 and the upper bracket 138. When the movable frame 92 is rotated toward the vehicle front side, the support shaft 102 is rotated in the one direction about its axis (the direction of arrow H in FIG. 5A and FIG. 5B) via the link mechanism 106 and the link mechanism 112.

At this time, the lock gear 120 is relatively rotated with respect to the cam 130 in the one direction about its axis, and the ratchet tooth 136A of the ratchet 136 meshes with the first locking portion 124 of the lock gear 120. For this reason, the rotation of the lock gear 120 is regulated by the ratchet 136, and the movable frame 92 is adjusted to the first adjustment position. Because of this, the movable pad 20 is adjusted to the first adjustment position (the state shown in FIG. 7A).

When the straps 22 are further pulled toward the vehicle front side, the movable frame 92 is rotated toward the vehicle front side, and the support shaft 102 is further rotated in the one direction about its axis (the direction of arrow H in FIG. 6A and FIG. 6B) via the link mechanism 106 and the link mechanism 112. At this time, the lock gear 120 is further relatively rotated with respect to the cam 130 in the one direction about its axis, and the ratchet tooth 136A of the ratchet 136 meshes with the second locking portion 126 of the lock gear 120. For this reason, the rotation of the lock gear 120 is regulated by the ratchet 136, and the movable frame 92 is adjusted to the second adjustment position. Because of this, the movable pad 20 is adjusted to the second adjustment position. In this state, the stopper pin 128 of the lock gear 120 is moved to the other end side of the long hole 132 in the cam 130.

When the straps 22 are further pulled toward the vehicle front side after the movable pad 20 has been adjusted to the second adjustment position, the stopper pin 128 presses the other end of the long hole 132 because the stopper pin 128 of the lock gear 120 has been moved to the other end of the long hole 132 in the cam 130, whereby the lock gear 120 and the cam 130 are integrally rotated in the one direction about their axes. At this time, the ratchet tooth 136A slides on the cam-side slanted surface 134 and slides on the sliding surface 131 of the cam 130 (the state shown in FIG. 6B). In this state, when the straps 22 are released, the lock gear 120 is relatively rotated in the other direction about its axis with respect to the cam 130 by the biasing force of the coil spring 118, and the stopper pin 128 moves from the other end to the one end of the long hole 132. For this reason, the cam-side locking surface 134 of the cam 130 becomes accommodated in the recessed portion 122 of the lock gear 120. Because of this, the movable frame 92 is returned to the initial state.

Here, as a result of the passenger pullingly operating the straps 22, the angle adjusting mechanism 90 adjusts the movable pad 20 of the rear seat back 16 in the vehicle front direction to a predetermined angle. Moreover, as a result of the passenger pullingly operating the strap 88, the trunk-through mechanism 30 forwardly collapses the movable pad 20 and the forwardly collapsible pad 24 of the rear seat back 16 in the vehicle front direction from the rear seat back 16, and the communicating hole 34 in the frame 32 is opened.

For this reason, in this seat back device, the angle of the movable pad 20 of the rear seat back 16 can be adjusted, and the vehicle cabin and the trunk room can be communicated. Because of this, passenger comfort can be ensured and long items of luggage can be accommodated.

Further, when the movable pad 20 and the forwardly collapsible pad 24 are accommodated in the rear seat back 16 (placed in the initial state), the middle portion 142 of the wire 140 is positioned on the upper side and the front side of the hook bracket 70 and is placed outside the rotational trajectory of the hook bracket 70. For this reason, the hook bracket 70 is made rotatable, the hook bracket 70 becomes disengageable from the middle portion 42 of the striker 40, and the movable pad 20 and the forwardly collapsible pad 24 are made forwardly collapsible from the rear seat back 16.

On the other hand, when the movable pad 20 has been adjusted to the first adjustment position and the second adjustment position, the upper bracket 138 is rotated in the vehicle front direction, whereby the middle portion 142 of the wire 140 secured to the upper bracket 138 is rotated toward the hook bracket 70. At this time, the middle portion 142 of the wire 140 moves on the upper side of the upper bracket 70 and is placed on the rotational trajectory of the hook bracket 70. In this state, when the strap 88 is pulled toward the vehicle front side, the hook bracket 70 interferes with the middle portion 142 of the wire 140 and the hook bracket 70 is not rotated because the middle portion 142 of the wire 140 is positioned on the rotational trajectory of the hook bracket 70. Because of this, when the movable pad 20 has been adjusted to the first adjustment position and the second adjustment position, the hook bracket 70 becomes non-disengageable from the middle portion 42 of the striker 40, and the movable pad 20 and the forwardly collapsible pad 24 cannot be forwardly collapsed from the rear seat back 16.

For this reason, the movable pad 20 and the forwardly collapsible pad 24 can be forwardly collapsed from the rear seat back 16 only when the movable pad 20 is accommodated in the rear seat back 16 (only when the movable frame 92 is in the initial state).

Consequently, when forwardly collapsing the movable pad 20 and the forwardly collapsible 24, the movable pad 20 is invariably accommodated in the back pad 18. Because of this, a situation where the movable pad 20 and the forwardly collapsible pad 24 are not forwardly collapsed all the way as a result of the movable pad 20 which has been adjusted to a predetermined angle becoming an obstacle to the forwardly collapsing operation of the movable pad 20 and the forwardly collapsible pad 24 can be prevented.

Moreover, if the rear seat back 16 were to be forwardly collapsed in a state where the movable pad 20 which has been adjusted to a predetermined angle becomes an obstacle and the movable pad 20 and the forwardly collapsible pad 24 are not forwardly collapsed all the way, there is the potential for an excessive load to act on the angle adjusting mechanism 90 and for the angle adjusting mechanism 90 to be damaged. However, the movable pad 20 is accommodated in the back pad 18, so a situation where an excessive load acts on the movable pad 20 can be suppressed, and damage to the movable pad 20 can be prevented.

Further, the movable pad 20 is secured to the base portion 48 via the upper bracket 138 and the movable frame 92, and the forwardly collapsible pad 24 is secured to the base portion 48. When using the trunk-through function, the movable pad 20 and the forwardly collapsible pad 24 are forwardly collapsed as a result of the base portion 48 rotating. Because of this, parts that forwardly collapse the movable pad 20 and the forwardly collapsible pad 24 can be shared.

Moreover, the wire 140 is coupled to the upper bracket 138, and when the movable frame 92 is in the initial state, the wire 140 is placed outside the rotational trajectory of the hook bracket 70, whereby the hook bracket 70 is made rotatable. Further, when the movable frame 92 has been adjusted to a predetermined angle, the wire 140 is placed on the rotational trajectory of the hook bracket 70, whereby the hook bracket 70 is made non-rotatable. Because of this, with a simple configuration, when the movable pad 20 is accommodated in the rear seat back 16, the movable pad 20 and the forwardly collapsible pad 24 can be made forwardly collapsible from the rear seat back 16, and when the movable pad 20 has been adjusted to a predetermined angle, the movable pad 20 and the forwardly collapsible pad 24 can be made forwardly non-collapsible from the rear seat back 16.

In the present embodiment, the seat back device 10 has been given a configuration where the movable pad 20 and the forwardly collapsible pad 24 of the rear seat back 16 are forwardly collapsed in the case of using the trunk-through function. Instead of this, the seat back device 10 may also be given a configuration where the back pad 18, the forwardly collapsible pad 24, and the movable pad 20 of the rear seat back 16 are forwardly collapsed.

Further, in the present embodiment, the hook bracket 70 is made disengageable from the middle portion 42 of the striker 40 as a result of the hook bracket 70 being rotated. Instead of this, the seat back device 10 may also be given a configuration where the hook bracket 70 is made disengageable from the middle portion 42 of the striker 40 as a result of the hook bracket 70 being linearly moved.

What is claimed is:

1. A seat back device comprising:
   a seat back that is placed on a rear side of a vehicle cabin and has a movable portion that is movably disposed in correspondence to a lower back region of a seated passenger and a forwardly collapsible portion that is forwardly collapsibly disposed above the movable portion at least when the movable portion is in a closed configuration;
   a frame member that is disposed inside the seat back and in which is formed an open portion that has a size including the movable portion and the forwardly collapsible portion and that makes the vehicle cabin and a luggage compartment communicate;
   an angle adjusting mechanism which, as a result of being operated by the passenger, adjusts the movable portion about an axis along a vehicle width direction to a predetermined angle; and
   a trunk-through mechanism which, as a result of being operated by the passenger, forwardly collapses the movable portion and the forwardly collapsible portion from the seat back and opens the open portion.

2. The seat back device according to claim 1, wherein when the movable portion is accommodated in the seat back, the movable portion and the forwardly collapsible portion are made forwardly collapsible from the seat back, and when the movable portion is adjusted to the predetermined angle, the movable portion and the forwardly collapsible portion are made forwardly non-collapsible from the seat back.

3. The seat back device according to claim 1, wherein the trunk-through mechanism is equipped with a base portion that is placed inside the open portion, is rotatably supported on the frame member, and to which the movable portion and the forwardly collapsible portion are directly or indirectly secured and
   a lock portion that is disposed on the base portion and which, by rotating, is made disengageable from a striker disposed on the seat back.

4. The seat back device according to claim 3, wherein the angle adjusting mechanism is equipped with
   a movable frame that is rotatably supported on the base portion and to which the movable portion is secured,
   a rotating disc that is coupled to the movable frame, is rotated in conjunction with the rotation of the movable frame, and on whose outer peripheral portion is disposed a locking portion,
   a ratchet that is disposed on the base portion and regulates the rotation of the rotating disc by meshing with the locking portion, and
   a regulating portion that is coupled to the movable frame, makes the lock portion rotatable as a result of being placed outside a rotational trajectory of the lock portion when the movable frame is in an initial position, and makes the lock portion non-rotatable as a result of being placed on the rotational trajectory of the lock portion when the movable frame has been adjusted to a predetermined angle.

* * * * *

UNITED STATES PATENT AND TRADEMARK OFFICE
CERTIFICATE OF CORRECTION

PATENT NO. : 8,622,468 B2  
APPLICATION NO. : 13/190331  
DATED : January 7, 2014  
INVENTOR(S) : Masuda et al.

Page 1 of 1

It is certified that error appears in the above-identified patent and that said Letters Patent is hereby corrected as shown below:

On the title page (item 73, Assignee) at line 1, Change "Springs" to --Spring--.

Signed and Sealed this  
Fifth Day of August, 2014

Michelle K. Lee  
*Deputy Director of the United States Patent and Trademark Office*